United States Patent Office 3,629,403
Patented Dec. 21, 1971

3,629,403
METHOD OF TREATING ACNE
Harry W. Gordon, Bronx, N.Y., and Carl P. Schaffner, Trenton, N.J., assignors to Julius Schmid Inc., New York, N.Y.
No Drawing. Filed Mar. 3, 1969, Ser. No. 803,994
Int. Cl. A61k 21/00
U.S. Cl. 424—117                                6 Claims

ABSTRACT OF THE DISCLOSURE

A method of treating acne in a male host is described herein, which comprises orally administering an effective dose of a heptaene polyenic macrolide.

---

This invention relates to the oral administration of a composition containing a heptaene polyenic macrolide compound and to the method of treating acne in a mammal host without producing hyperestrogenism.

In the treatment of acne it has been frequently the practice to administer orally natural or synthetic horomones as androgen antagonists (e.g. estrogenic preparations) to control and/or overcome the hyperandrogenism in the host being treated. However, the use of such hormones to treat such conditions carries with it the usual problems and side effects including a feminizing effect. Hence, treatment of excess androgen levels with estrogens has substantial limitations.

It has now been unexpectedly discovered that the oral administration in a solid pharmaceutical formulation of a heptaene polyenic macrolide is useful for treatment of acne in a mammal afflicted with acne.

Accordingly, one aspect of the present invention is to provide an orally administered composition for use in the treatment of acne in a male host without producing any substantially hyperestrogenic effect.

Another aspect of the present invention is to provide a method for treating a host having acne which comprises orally administering an effective dose of a specific known polyenic macrolide compound.

An additional aspect of the present invention relates to the reduction of sperm levels in a male host.

Other aspects of the invention will be apparent from the following detailed description.

The compositions claimed herein for treating acne in a male warm-blooded mammal comprise the well known polyenic macrolide antifungal antibiotic compounds candicidin, amphotericin B, fungimycin, hamycin and trichomycin.

The known polyenic macrolide compounds have been produced as antibiotics by cultivation of Streptomyces in different media and by extraction of the substances from these cultures. It has been demonstrated in the literature that the known polyenic compounds are (1) of fairly high molecular weight (ca.700–1500), (2) contain macrocyclic lactones, better known as macrolides hereinafter referred to as "polyenic macrolide compounds"), and (3) each possess a chromophore in the nucleus of from four to seven conjugated double bonds (tetraenes, pentaenes, hexaenes, and heptaenes) identified by examination of their ultra-violet absorption spectra. These conjugated systems are generally unsubstituted (except the methyl pentaenes) and either of the "all-trans" or "cis-trans" configuration. Based on the evidence available to date, it is indicated that the known polyenic macrolide compounds contain a twenty-six to a thirty-seven membered lactone ring wherein all of the ring atoms except the single oxygen atom are carbons. The evidence to date also indicates that only C, H, O, and N are present in the known polyenic macrolide compounds.

The polyenic macrolide nucleus contains a relatively planar lipophilic section (polyenic chromophore) and a less rigid hydrophilic section due to the presence of highly polar substituents, particularly hydroxyls, as well as other substituents which will be discussed in detail later herein. All of the known polyenic macrolide compounds contain at least one hydroxyl moiety and in some cases at least six hydroxyl moieties.

The following articles should be consulted for references to the discovery, isolation and chemical properties of the polyenic macrolide compounds:

(1) Vining, "The Polyene Antifungal Antibiotics," Hindustan Antibiotics Bull., vol. 3, pp. 32–54 (1960).

(2) Walksman et al., "The Actinomycetes, vol. III, Antibiotics of Actinomycetes" (Williams and Wilkins, Baltimore, 1962).

(3) Droughet, "Noveaux Antibiotiques Antifongiques," Symp. Int. Chimiotherapie, Naples, 1961, pp, 21–50 (1963).

(4) W. Oroshnik et al., "Fortschritte der Chemie Organischer Naturstoffe," vol. XXI, pp. 18–79 (1963).

The heptaene polyene macrolides claimed herein are classifiable into the following groups:

(A) Aromatic I.—Identified as those compounds containing the heptaene macrolide nucleus, one carboxyl group, a single amino sugar moiety (mycosamine) glycosidically linked to the macrolide nucleus and a p-aminophenyl radical aldolically linked to the macrolide nucleus. Representatives of this group are (a) candicidin which may possibly be identical to trichomycin A, hamycin (minor component), heptamycin, ascosin and levorin $A_2$, (b) trichomycin B which may possibly be identical to levorin $A_3$, hamycin (major component) and PA–150; and (c) levorin A.

(B) Aromatic II.—Identified as those compounds containing the heptaene macrolide nucleus, one carboxyl group, an amino sugar (mycosamine) glycosidically linked to the macrolide nucleus, and a N-methyl-p-aminophenyl radical aldolically linked to the macrolide nucleus. Representative polyenic macrolides of this group are: (a) candimycin, and (b) hamycin (minor component of hamycin complex).

(C) Aromatic III.—Identified as those compounds containing the heptaene macrolide nucleus, an N-methyl-p-aminophenyl radical aldolically linked to the macrolide nucleus, and an amino sugar (perosamine), glycosidically linked to the macrolide nucleus. It is noted that the aromatic amino moiety just identified has previously been incorrectly reported in the literature as a p-aminobenzyl moiety. Representative of this group is fungimycin. This substance was originally styled by number 1968 and for a brief interval identified as perimycin and aminomycin.

(D) Non-aromatic.—Identified as those compounds containing the heptaene macrolide, nucleus one carboxyl moiety and a single amino sugar (mycosamine), glycosidically linked to the macrolide nucleus. Representative of this group are: (a) candidin; (b) candidinin; (c) candidoin; (d) amphotericin B; (e) mycoheptin; (f) levorin B; and (g) antibiotic F–17–C.

It will be understood that where a polyenic macrolide compound of the class herein described is identical with one of the above named compounds, but has been known by another name by reason of independent production or production in accompaniment to other antibiotics, the identification of such substances by the name set forth above is intended to mean the same compound under all other designations.

Dosage units of the polyenic macrolide compounds for oral administration may be prepared in a variety of solid forms such as capsules and tablets. The dose supplied by each capsule or tablet is between about 25 mg. to about 250 mg. of polyenic macrolide compound, preferably between about 50 and about 200 mg. The capsules employed may be composed of materials such as gelatin, cellulose derivatives, etc. The active ingredient may be formulated with other materials in accordance with conventional procedure employing solid carriers, and lubricants well known in the art. Examples of solid carriers are: starch, sugar, and bentonite.

The following examples illustrate suitable pharmaceutical formulations containing the compounds of this invention.

EXAMPLE 1

Hard gelatin capsule available from the Robin Pharmacal Corporation (size 00) is filled with about 0.83 grams of lactose and about 100 mg. of candicidin, the lactose and active ingredient being triturated together in a pestle and mortar until a very fine yellow amorphous powder resulted, prior to filling of the capsule. Obviously, any desired number of capsules may be filled by mixing together any amount of lactose and active ingredient in the same weight ratio indicated above so that each capsule will contain 100 mg. active ingredient; and the quantity of active ingredient may be altered, as desired, by varying the weight ratio of the indicated materials.

EXAMPLE 2

125 g. of corn starch and 2112.5 g. lactose are dried at 140° F. for 12 hours before compounding. After drying, each of these materials is sifted through a No. 14 mesh stainless steel screen. The sifted corn starch and lactose are thoroughly mixed for 30 minutes and to this mixture there is added a blended mixture of 250 g. candicidin and 12.5 g. magnesium stearate. This admixture is blended and then compressed by means of a tableting machine into 5000 substantially round tablets each containing 50 mg. active ingredient and weighing 500 mg.

EXAMPLE 3

Enteric tablets for use in this invention may be formulated as follows:

16 g. of powdered corn starch (U.S.P. quality) is dried at 120° F. for 12 hours and passed through a No. 25 mesh stainless steel screen. The sifted corn starch is then mixed with 255 g. of anhydrous lactose (direct tablet grade). To this mixture, 4 g. of magnesium stearate is added followed by 50 g. of candicidin. These materials are then mixed in a small pebble mill for 30 minutes and compressed on a single punch machine producing 1,000 tablets, each containing 50 mg. active ingredient. Each tablet weighs approximately 325 mg. The average hardness is 6, as measured on a Monsanto Hardness Tester.

The tablets are then placed in a coating pan rotating at 29 r.p.m. and subjected to warm air of approximately 80° F. for about 10 minutes. Then 30 cc. of a pharmaceutical glazed composition is applied, this composition being refined wax and rosin free orange flake shellac with anhydrous alcohol as the medium therefor. Talcum (U.S.P.) is applied to the tablets to prevent the tablets from sticking to each other or to the pan and this procedure is followed after the application of each coat to the tablets. The coat is allowed to dry for approximately one hour. Thereafter three additional coats are applied in a similar manner, each coat comprising 30 cc. of the pharmaceutical glaze, with approximately one hour of drying time between the application of successive coats. After four coats are applied the tablets are dried overnight at room temperature and then four more coats are applied in the same manner except that each coat is allowed to air dry for 3 hours before applying the next coat. Each of the 8 coats of the enteric tablets is approximately 0.001 inch in thickness. Obviously, the thickness of the coating can be controlled by varying the concentration of the pharmaceutical glaze in the alcohol medium.

The enteric tablets are tested in accordance with the in vitro disintegration test for enteric-coated tablets described in U.S.P. XVII and were found to pass this test.

While the number of coats used in the example heretofore described is 8, it will be appreciated that there are many factors to be considered which permit variation in the number of coats, including the size and shape of the tablets or capsules, the type of coat or combination of coats, etc.

Other procedures and materials well known in the prior art may be employed to prepare suitable enteric coatings. The selection of the coating substance is governed to a large extent by pH and enzyme considerations and the desire to have the enteric composition disintegrate or dissolve when it reaches the duodenum region of the intestinal track and not in the stomach. The disintegration or dissolution of an enteric coating in the intestinal tract usually depends on several factors, the most important of which are (1) the presence of acidic groups in the enteric substance which cause it to be insoluble in the low pH environment of the stomach but soluble in the intestinal tract due to the higher (but usually not alkali) pH of the media there, and (2) the resistance of the coating to attack by oral and gastric enzymes. For the purpose of this invention, therefore, the term "enteric" will apply to any tablet or capsule formulated with a polyenic macrolide which will maintain the integrity of the macrolide nucleus during passage through the stomach of the host body:

Illustrative of other well known substances that may be used for the enteric coating are the following: cellulose acetate phthalate with resinous carrier; cellulose acetate phthalate-tolu balsam-shellac; cellulose acetate phthalate with fats and waxes; shellac-castor oil; ammoniated shellac; shellac- stearic acid-tolu balsam; stearic acid-castor oil over shellac-silica gel, cellulose acetate phthalates with or without plasticizer and dusting powder(s); acid phthalates of glucose, fructose, etc.; ternary copolymers of styrene, methacrylic acid and butyl half-ester of maleic acid; alkyd resin-unsaturated fatty acids-shellac; polyvinyl acid phthalate, etc.

For a description of the procedure for manufacturing enteric formulations such as those exemplified heretofore, reference should be made to U.S. Pats. Nos. 2,196,768; 2,433,244; 2,455,790; 2,540,979; 2,858,252; 3,080,346, and British Pats. Nos. 760,403 and 820,495.

The claimed polyenic macrolides may be used to treat acne in a host.

In order to obtain the highest degree of effectiveness of the compositions of this invention per given dose of active ingredient, it is desirable to use an enteric tablet or capsule. Thus when using a specific known polyene macrolide compound in the form of an enteric solid, the entire compound will remain intact when it reaches the intestinal tract so long as the enteric coating composition retains its integrity in the stomach. On the other hand, administration of the same dose in a standard solid pharmaceutical formulation may result in a cleavage of any amino sugar present, or of other groups similarly sensitive to gastric conditions. Such cleavage may further result in alteration of the polyenic macrolide nucleus, thereby diminishing the effectiveness of the active ingredient.

The effective dosage of the compounds of this invention depends upon the severity of condition, the stage and the individual characteristics of each host being treated. It is expected that the compositions will generally be administered in a dosage range from 5 mg. to 120 mg. active ingredient per kg. of body weight per day and preferably from 10 mg. to 90 mg. per kg. of body weight per day.

Other tests conducted with candicidin in male dogs at dose levels of at least 20 mg./kg. of body weight per day reveal a substantial reduction in the sperm count suggesting the possibility that the compositions of the present invention have application in the field of male contraception.

What is claimed is:

1. A process for treating acne in a mammal afflicted with acne which comprises orally administering to said mammal an effective dose for treating acne of a composition comprising candicidin.

2. A process according to claim 1 wherein said candicidin is contained in a hard shell capsule.

3. A process for treating acne in a mammal afflicted with acne which comprises orally administering to said mammal an effective dose for treating acne of a composition comprising amphotericin B.

4. A process for treating acne in a mammal afflicted with acne which comprises orally administering to said mammal an effective dose for treating acne of a composition comprising fungimycin.

5. A process for treating acne in a mammal afflicted with acne which comprises orally administering to said mammal an effective dose for treating acne of a composition comprising hamycin.

6. A process for treating acne in a mammal afflicted with acne which comprises orally administering to said mammal an effective dose for treating acne of a composition comprising trichomycin.

References Cited

UNITED STATES PATENTS 3,244,590  4/1966  Schaffner et al. _____ 424—181

OTHER REFERENCES

Louria, Antibiotics and Chemotherapy, vol. 5, No. 5, pp. 295–301 (1958).

Korzybski et al., Antibiotics, Origin, Nature, and Properties, Polish Scientific Publishers, Warsaw, Poland, pp. 798, 805, 806, 807, 808, 824, 825, 826, 827, 829–834 (1967).

Kligman et al., Proc. Soc. Exp. Bioc. Med., vol. 82, p. 399 (1953).

Harrow, Biochemistry, 5th Edition, 1951, pp. 522 and 523.

Conn, Current Therapy 1970, pp. 534–537.

JEROME D. GOLDBERG, Primary Examiner

U.S. Cl. X.R.

424—119, 120, 122